May 7, 1957     H. G. GROSS     2,791,522
INSULATED CERAMIC CONDUCTORS
Filed Sept. 20, 1955
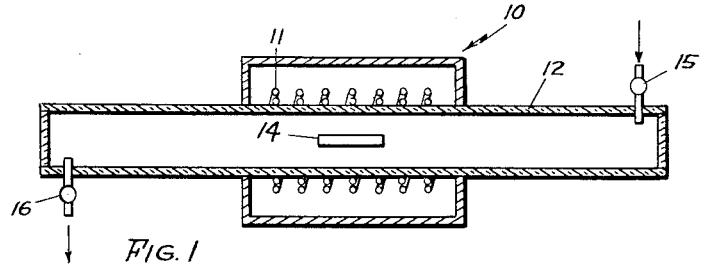
Fig. 1
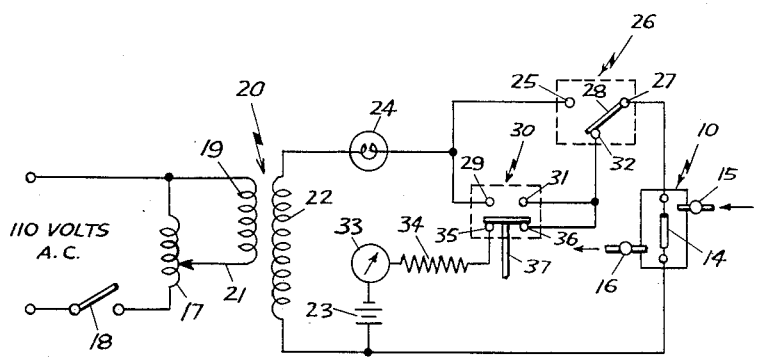
Fig. 2
Fig. 3
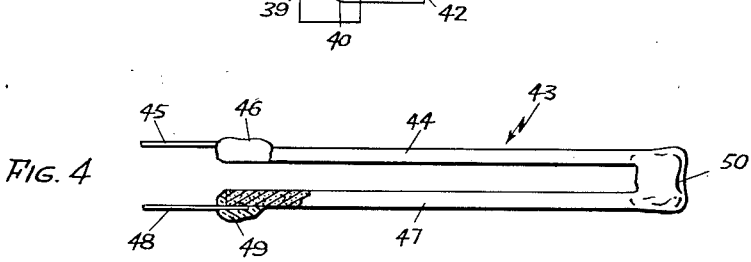
Fig. 4
Fig. 5
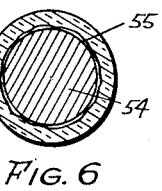
Fig. 6
INVENTOR
HERBERT GERALD GROSS
BY Elmer J. Gorn
ATTORNEY United States Patent Office 2,791,522
Patented May 7, 1957

2,791,522
INSULATED CERAMIC CONDUCTORS

Herbert Gerald Gross, Waltham, Mass., assignor to Raytheon Manufacturing Company, Waltham, Mass., a corporation of Delaware Application September 20, 1955, Serial No. 535,407

6 Claims. (Cl. 117—216)

This invention relates to resistive elements and more specifically to a method for preparing an insulated coating over said resistive elements.

In this invention there is shown a method of preparing a coating over a resistive element that comprises heating a refractory member in an atmosphere of a hydrocarbon gas at a temperature and for such a time that said member is rendered conductive or carbidized. A cement preferably consisting of a blend of alumina and colloidal silica that is mixed to a consistency of light cream is then coated over the surface of said member. Said member is then heated at a temperature of approximately 1500° C. for a period of time sufficient to render said coating rigid, after which said member is heated in an atmosphere of a hydrocarbon gas at a temperature and for such a time that said member is again rendered conductive or carbidized. The last step consists in removing the surface carbidization of said member until said surface is nonconductive or decarbidized.

In the prior art the term carbidized has been applied to a method of making a refractory material, such as ceramic, conductive. At the present time it is not known how the carbidizing process makes the ceramic conductive. One field of thought suggests that a hard oxide resistive carbon is distributed within the pores of the refractory material and it is this deposit of carbon which actually makes the ceramic conductive. As a matter of definition, therefore, the term carbidized as used in this invention refers to the process of making a refractory material conductive and, conversely, the term decarbidized refers to the process of removing the conductive or carbidized material from the refractory material, thereby rendering the refractory material again nonconductive.

Heretofore, ceramic rods have been made conductive by the carbidizing process and an insulated coating prepared on the surface of said carbidized rod by the process known as decarbidization, which is believed to be an oxidizing process in which the carbon deposits are burned off. In these prior methods, it has been proven very difficult to control the depth of penetration of the surface decarbidization. In this invention it has been found that, after the rod has been carbidized a ceramic cement coating placed over the carbidized refractory material will not penetrate into the pores of said refractory member as will normally happen in an uncarbidized refractory member. Therefore, after sinter firing the member, which has the effect of making the ceramic coating rigid, and also removes the original carbidization of the refractory member, a member is produced having a cross-section of a ceramic core covered by a binder which, in turn, is covered by an external covering of ceramic material. The next step consists of a carbidizing step in which the complete member is rendered conductive after which the surface material is decarbidized. An external coating, prepared according to the principles of this invention, was found to decarbidize more readily than the main body of the refractory material, thereby giving more control over the decarbidizing process. As a consequence, therefore, it is now possible to control the thickness of the insulated coating desired on any ceramic conductor and also to produce a thick hard insulation if desired.

Further objects and advantages of this invention will be apparent as the description progresses, reference being made to the accompanying drawing wherein:

Fig. 1 represents a cross-section of an oven for carrying out part of the steps of the process;

Fig. 2 is a schematic diagram illustrating means for carrying out the equalizing step of the process;

Fig. 3 illustrates a method for accomplishing the decarbidizing step;

Fig. 4 is a filament structure utilizing the refractory members prepared according to the principles of this invention;

Fig. 5 is a resistive element suitable for use as a resistor or a filament; and

Fig. 6 is a cross-section of a refractory member illustrated in Fig. 5 having an external insulator coating.

Referring now to Fig. 1, there is shown an electric oven 10 comprising heating elements 11 connected to a source of power, not illustrated. The heating portion of said oven 10 is enclosed by member 12, thereby making that portion of said oven where refractory material 14 is placed to be heated airtight. Located at each end of member 12 is a valve 15 and 16 to which any gas necessary for the process may be attached. If leads are to be attached to member 14, it has been found desirable to attach the leads to said member 14 before it is placed in oven 10 by using a cement comprising a binder and powdered refractory material, preferably one having the same coefficient of expansion as refractory member 14. Valves 15 and 16 are then opened to the atmosphere and oven 10 is heated to a temperature of approximately 1520° C. for a time depending on the type and size of the ceramic, thereby making member 14 rigid. Normally, the first step of the process is called the carbidization step during which member 14 is rendered conductive. Member 14 is again placed within oven 10, except that in this step valve 15, which controls the inlet port of the interior of oven 10, is connected to a source of hydrocarbon gas, such as methane, not illustrated. The volume of methane gas used should be such that the complete interior of oven 10 is enveloped within an atmosphere of the gas. Oven 10 is again heated to a temperature of approximately 800° C. to 1400° C. for a time depending on the size of member 14 and the ultimate value of conductivity or resistivity desired in member 14.

After the carbidizing step, a cement mixture preferably consisting of a blend of alumina and colloidal silica mixed to a consistency of light cream is applied to the surface areas of member 14 that is desired to be insulated. In order to solidify the cement coating, member 14 is again placed in oven 10 which is heated to a temperature of approximately 1500° C. which will not only surface harden the ceramic coating, but also decarbidize the original core of member 14. Since the high temperature necessary for the sintering of the cement coating has decarbidized or rendered the refractory member 14 nonconductive, it is now necessary to repeat the first step of the process in order to render the complete member 14 conductive or carbidized. This step includes the heating of member 14 to a temperature of approximately 800° C. to 1400° C. in the presence of a hydrocarbon gas.

Depending on the ultimate use that member 14 will have, it is found desirable at this point in the process to include an optional step called an equalizing step in which the resistance or conductivity of member 14 is accurately determined and also to render the carbidizing process more uniform. In general, the equalizing step is accomplished by heating member 14 in the presence of a hydrocarbon gas while an electric current is passed through said member. Referring now to Fig. 2, there is shown a schematic diagram for passing electric current through member 14 as it is being heated and also including means for periodically testing the resistivity or conductivity of said member 14. In Fig. 2, there is shown an autotransformer 17 having its input connected in series with switch 18 to a source of potential, not illustrated, and the output connected to the primary 19 of stepup transformer 20. Sliding arm 21 on autotransformer 17 enables the voltage fed to primary windings 19 to be continuously variable from zero to approximately 130 volts. One end of secondary winding 22 of transformer 20 is connected to a junction of battery 23 and member 14 which is located in oven 10. The other end of secondary coil 22 is connected to a current limiting bulb 24 which, in turn, is connected to a normally-open terminal 25 of a single-pole, double throw switch 26. Terminal 27 of said switch, which contains operating arm 28, is connected to the other side of member 14. Connected to the junction of terminal 25 and current limiting bulb 24 is terminal 29, which is normally opened, of switch 30. Terminal 31 of switch 30 is connected to normally-closed terminal 32 of switch 26. The other end of battery 23 is connected to meter 33 which, in turn, is connected to current limiting resistor 34 which, in turn, is connected to terminal 35 of switch 30. Terminal 36 of switch 30 is connected to the junction of terminal 31 and terminal 32 of switch 30 and 26, respectively. Switch 30 is designed to maintain a closed circuit between terminals 35 and 36 and maintain an open circuit between terminals 29 and 31 in its normal position. Upon depressing operating arm 37, a closed circuit will appear between the normally open terminals 29 and 31 and, conversely, the normally closed circuit between terminals 35 and 36 will be open. Upon releasing operating arm 37, the switch will revert to its original position as illustrated. When equalizing member 14, switch 18 is closed, switch 26 is closed, thereby making a circuit between terminals 25 and 27, causing oven 10 to be heated. In the equalizing process, a hydrocarbon gas is again used to envelop the atmosphere within oven 10. In this position, switch 26, arm 21, and autotransformer 17 will control the current passing through member 14. Switch 26 is used for a course control of the conductivity of member 14. The final resistance is determined by placing operating arm 28 of switch 26 in a position as shown which establishes a circuit between terminals 32 and 27. By properly choosing resistor 34 and calibrating meter 33, it is now possible to directly read the resistance of member 14 on meter 33. Operating arm 37 of switch 30 is then intermittently and alternately depressed, thereby intermittently heating member 14 by forcing current through said member and reading its resistance, which process is continued until the final value of resistance of member 14 is obtained. When it has been determined in advance that member 14 would be equalized, the standard procedure is to arrest the first step of the carbidization process when the resistance has decreased to a value of approximately one and one-half to three times the desired resistance of the finished member. In utilizing the process described in Fig. 2, most often one section of member 14 being heated will glow unevenly as that one section reaches a higher temperature which is, in part, due to the nonuniformity of the conductivity on carbidization of member 14. If the voltage across member 14 is continuously adjusted by means of arm 21 to keep the hottest portion at about this temperature, the glow eventually would spread uniformly over the entire member. Since the glow temperature is approximately between 900° C. and 1,000° C., it is believed that carbidization is again started in this brighter section, thereby causing a drop in the resistance. This process is continued by raising the voltage on member 14, which will again cause the hot areas to carbidize until a point is reached when the entire member 14 reaches the glow temperature uniformly, thereby indicating a uniform conductivity or uniform carbidization. The effect of further carbidization, since it decreases the resistance of the entire member 14, will cause the current and temperature to increase sharply, thereby necessitating that the voltage, as controlled by operating arm 21, be cut rapidly in order to prevent member 14 from being burned up. Thus, after the stage of uniform glow is reached, the resistance of member 14 can be brought down to any value desired by utilizing the fine resistance control method just described.

The next step of the process is called the decarbidizing or insulating step. In this step the surface carbidization of member 14 is removed, leaving a surface insulation that is as mechanically strong as the conductive portion. Several methods of decarbidization have been discovered which include immersion of a cold member 14 in a hot oxidizing gas, immersion of a hot member 14 in a cold oxidizing gas, immersion of member 14 in the positive column of a Geisler discharge in an oxidizing gas, heating the surface of member 14 and brushing of the heaters with a corona discharge. At the present time the exact chemical reaction taking place on the surface to produce the effect known as decarbidization is not known. It is believed that an oxidizing or burning away of the surface carbidization takes place. In the preferred step member 14 is heated to 300° C. to 600° C. for a period of time sufficiently to cause the surface of said member 14 to become nonconductive or decarbidized. This process can take place in the presence of air or any gas containing oxygen. The combination of temperature and time is determined by the size of member 14 and the depth of decarbidization desired on the surface of said member. Referring now to Fig. 3, there is shown a Tesla coil 38 having its primary windings 39 connected to a source of potential, not illustrated, and a secondary winding 40 connected to discharge terminals 41 and 42. Decarbidization is produced by passing member 14 through the corona discharge existing between terminals 41 and 42.

Referring now to Fig. 4 there is shown a filament 43 suitable for use in an electron discharge tube constructed according to the principles of this invention. A ceramic rod 44 having a length equal to the desired filament length has a lead 45 attached at one end by a ceramic cement 46 comprising a binder, such as colloidal silica gelatin or a similar substance, and powdered refractory material either of the same type as member 14 or one having a similar coefficient of expansion. In a similar manner, ceramic rod 47 having lead 48 is attached to one end by ceramic cement 49. The opposite ends of ceramic rods 44 and 47 are attached together by a ceramic cement 50 similar to 46 and 49, thereby producing a complete filament or heating element having the final desired shape. Filament 43 is then subjected to the complete process heretofore described, which consists of attaching the leads and the sintering step which makes the ceramic cement rigid, the carbidizing step which makes the filament 44 and 47 conductive, the coating step which consists in applying a ceramic cement coating on the surface of members 44 and 47, the sinter firing step which solidifies the ceramic coating on said members, the repeated carbidizing step which makes the filament 43 again conductive, the optional equalizing step which will make the conductivity uniform and also determine the final conductivity of said filament 43, and then the decarbidizing step which consists in removing from the periphery or surface of filament 43 all effects of the carbidizing step, thereby making said surface nonconductive. After filament 47 has completed all these steps, each part of the filament will, in effect, have a ceramic external insulating shell.

In Fig. 5 there is shown a ceramic rod 51 constructed in the form of a high voltage precision resistor having leads 52 and 53 cemented at each end. The process for preparing resistor 51 is the same as that for preparing member 14 with the addition of leads 52 and 53 being added before the process is started, in a similar manner as leads 45 and 48 are added in Fig. 4. Fig. 6 illustrates the internal conductive member 54 covered by a binder 55, which in turn, is covered by the decarbidized ceramic coating 56 which has now reverted to its original state as a decarbidized ceramic which is nonconductive.

This invention is not limited to the particular details of construction, materials and processes described as many equivalents will suggest themselves to those skilled in the art. It is, accordingly, desired that the appended claims be given a broad interpretation commensurate with the scope of the invention within the art.

What is claimed is:

1. A method of preparing an insulated coating over a resistive element that comprises heating a refractory member in an atmosphere of a hydrocarbon gas at a temperature and for such a time that said member is rendered conductive, then coating the surface of said member with a cement comprising a mixture of a binder and powdered refractory material, then heating said member at a temperature sufficient to make said cement coating rigid, then heating said member in an atmosphere of a hydrocarbon gas at a temperature and for such a time that said member is again rendered conductive, and then removing the surface carbidization of said member until said surface is nonconductive.

2. A method of preparing an insulated coating over a resistive element that comprises heating a refractory member in an atmosphere of a hydrocarbon gas at a temperature and for such a time that said member is rendered conductive, then coating the surface of said member with a cement comprising a mixture of a binder and powdered refractory material, then heating said member at a temperature of approximately 1500° C. for a period of time sufficient to render said coating rigid, then heating said member in an atmosphere of a hydrocarbon gas at a temperature and for such a time that said member is again rendered conductive, and then removing the surface carbidization of said member until said surface is nonconductive.

3. A method of preparing an insulated coating over a resistive element that comprises heating a refractory member in an atmosphere of a hydrocarbon gas at a temperature and for such a time that said member is rendered conductive, then coating the surface of said member with a cement comprising a mixture of a binder and powdered refractory material, then heating said member at a temperature sufficient to make said cement coating rigid, then heating said member in an atmosphere of a hydrocarbon gas at a temperature and for such a time that said member is again rendered conductive, and then passing said member through a corona discharge for a time sufficient to render said surface of said member nonconductive.

4. A method of preparing an insulated coating over a resistive element that comprises heating a refractory member in an atmosphere of a hydrocarbon gas at a temperature and for such a time that said member is rendered conductive, then coating the surface of said member with a cement comprising a mixture of a binder and powered refractory material, then heating said member at a temperature sufficient to make said cement coating rigid, then heating said member in an atmosphere of a hydrocarbon gas at a temperature and for such a time that said member is again rendered conductive, and then passing said member through a corona discharge for a time sufficient to render said coating on said member nonconductive.

5. A method of preparing an insulated coating over a resistive element that comprises heating a refractory member in an atmosphere of a hydrocarbon gas at a temperature and for such a time that said member is rendered conductive, then coating the surface of said member with a cement comprising a mixture of a binder and powdered refractory material, then heating said member at a temperature sufficient to make said cement coating rigid, then heating said member in an atmosphere of a hydrocarbon gas while a current is passed through said member at a temperature and for such a time that said member is rendered uniformly conductive, and then removing the surface carbidization of said member until said surface is nonconductive.

6. A method of preparing an insulated coating over a resistive element that comprises heating a refractory member in an atmosphere of a hydrocarbon gas at a temperature and for such a time that said member is rendered conductive, then preparing a cement consisting of a blend of alumina and colloidal silica mixed to a consistency of light cream, then coating the surface of said member with said cement, then heating said member at a temperature sufficient to make said cement coating rigid, then heating said member in an atmosphere of a hydrocarbon gas at a temperature and for such a time that said member is again rendered conductive, and then removing the surface carbidization of said member until said surface is nonconductive.

References Cited in the file of this patent

UNITED STATES PATENTS

| 1,570,137 | Fischer | Jan. 19, 1926 |
| 2,057,431 | Hobrock | Oct. 13, 1936 |
| 2,328,422 | Christensen | Aug. 31, 1943 |
| 2,330,129 | Lucas | Sept. 21, 1943 |
| 2,585,568 | Marshall | Feb. 12, 1952 |

FOREIGN PATENTS

| 141,599 | Australia | June 18, 1951 |